United States Patent
Hsu et al.

(10) Patent No.: US 8,231,366 B2
(45) Date of Patent: Jul. 31, 2012

(54) FAN, MOTOR AND AIR-COOLED BUSHING COMPRISING AN INTERNAL WALL, EXTERNAL WALL AND HOLLOW PORTION THEREBETWEEN

(75) Inventors: Shuo-Hsiu Hsu, Taoyuan Hsien (TW); Po-Hao Yu, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 634 days.

(21) Appl. No.: 12/397,781

(22) Filed: Mar. 4, 2009

(65) Prior Publication Data

US 2010/0124510 A1    May 20, 2010

(30) Foreign Application Priority Data

Nov. 18, 2008    (TW) .............................. 97144448 A

(51) Int. Cl.
*F04B 49/00*    (2006.01)
*F16C 3/16*    (2006.01)

(52) U.S. Cl. ................... 417/423.7; 417/423.8; 384/317

(58) Field of Classification Search .................. None
See application file for complete search history.

(56) References Cited

U.S. PATENT DOCUMENTS

| | | | | |
|---|---|---|---|---|
| 2,439,127 | A * | 4/1948 | Dailey, Jr. et al. | 266/256 |
| 4,006,944 | A * | 2/1977 | Ando et al. | 384/466 |
| 4,108,568 | A * | 8/1978 | Townsend | 415/98 |
| 4,304,095 | A * | 12/1981 | Rasanen | 60/39.35 |
| 6,023,117 | A * | 2/2000 | Chen | 310/91 |
| 6,102,675 | A * | 8/2000 | Hsieh | 417/423.13 |
| 6,210,042 | B1 * | 4/2001 | Wang et al. | 384/317 |
| 6,318,976 | B1 * | 11/2001 | Hsieh | 417/423.12 |
| 6,544,011 | B2 * | 4/2003 | Hsieh | 417/423.7 |
| 2006/0251350 | A1 * | 11/2006 | Hong et al. | 384/100 |
| 2006/0257250 | A1 * | 11/2006 | Wu et al. | 415/175 |

* cited by examiner

*Primary Examiner* — Anh Mai
*Assistant Examiner* — Britt D Hanley
(74) *Attorney, Agent, or Firm* — Muncy, Geissler, Olds & Lowe, PLLC

(57) ABSTRACT

A fan includes a frame, a motor, a hub and several blades surrounding around the hub. The frame includes a motor base, and the motor is disposed on the motor base and inside of the frame. The motor includes a bushing, a bearing, a shaft and at least one silicon steel sheet. The bushing has an internal wall, an external wall, and a hollow portion disposed between the internal wall and the external wall. The bushing is molded as a single piece and is unitary in construction. The bearing is disposed within the bushing, the shaft passes through the bearing, and the hub is connected with the shaft. The silicon steel sheet is disposed around the bushing.

18 Claims, 6 Drawing Sheets

F

FAN, MOTOR AND AIR-COOLED BUSHING COMPRISING AN INTERNAL WALL, EXTERNAL WALL AND HOLLOW PORTION THEREBETWEEN

CROSS REFERENCE TO RELATED APPLICATIONS

This Non-provisional application claims priority under 35 U.S.C. §119(a) on Patent Application No(s). 097144448, filed in Taiwan, Republic of China on Nov. 18, 2008, the entire contents of which are hereby incorporated by reference.

BACKGROUND OF THE INVENTION

1. Field of Invention

The present invention relates to a fan, motor and bushing thereof, and in particular to a fan and motor with a bushing capable of dissipating heat.

2. Related Art

Nowadays, electronic products are minimized and have powerful functions, so that the demands for heat dissipation are increased accordingly. That is, the heat dissipation efficiency must be increased for the electronic products. Because the fan has the advantages of low cost and well developed technique, it is widely used as a heat dissipating device.

The conventional bushing of a motor for a fan is formed with the motor base and the fan frame by plastic injection molding. Or, the bushing is a tubular copper sleeve and is connected with the motor base and the fan frame by plastic injection molding. However, either of the above-mentioned bushing is a tube composed of a single annular wall. When an outer-rotor type motor operates, the bearing and the shaft rub against with each other, and heats will be generated between the bearing and the shaft. Then, the heats will be conducted to other components of the motor through the bushing, so that the other components of the motor will be abnormal.

SUMMARY OF THE INVENTION

The present invention is to provide a fan, motor and bushing thereof, wherein heats generated between the shaft and the bearing can be dissipated effectively and will not be conducted to other components of the motor.

To achieve the above, the present invention discloses a motor including a bushing, a bearing, a shaft and at least one silicon steel sheet. The bushing is connected with the motor base. The bushing has an internal wall, an external wall and a hollow portion, wherein the hollow portion is disposed between the internal wall and the external wall, and the bushing is molded as a single piece and is unitary in construction. The bearing is disposed in the bushing. The shaft passes through the bearing. And the silicon steel sheet is disposed around the bushing.

To achieve the above, the present invention also discloses a fan including a frame, a motor, a hub and a plurality of blades. The frame includes a motor base, and the motor is disposed on the motor base and inside of the frame. The motor includes a bushing, a bearing, a shaft and at least one silicon steel sheet. The bushing is connected with the motor base. The bushing has an internal wall, an external wall, and a hollow portion disposed between the internal wall and the external wall. The bushing is molded as a single piece and is unitary in construction. The bearing is disposed within the bushing, the shaft passes through the bearing, and the silicon steel sheet is disposed around the bushing. The hub is connected with the shaft, and the blades are disposed around the hub.

As mentioned above, the fan, motor and bushing of the present invention has a hollow portion disposed between the internal wall and the external wall of the bushing. Because the hollow portion separates the internal wall and the external wall of the bushing and the airflows generated during the operation of the fan will take the heats away, thus heats generated between the shaft and the bearing are prevented from being conducted to other components of the motor, so that heats will not make the other components of the motor to be abnormal, and abnormal operation of the fan can be avoided.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
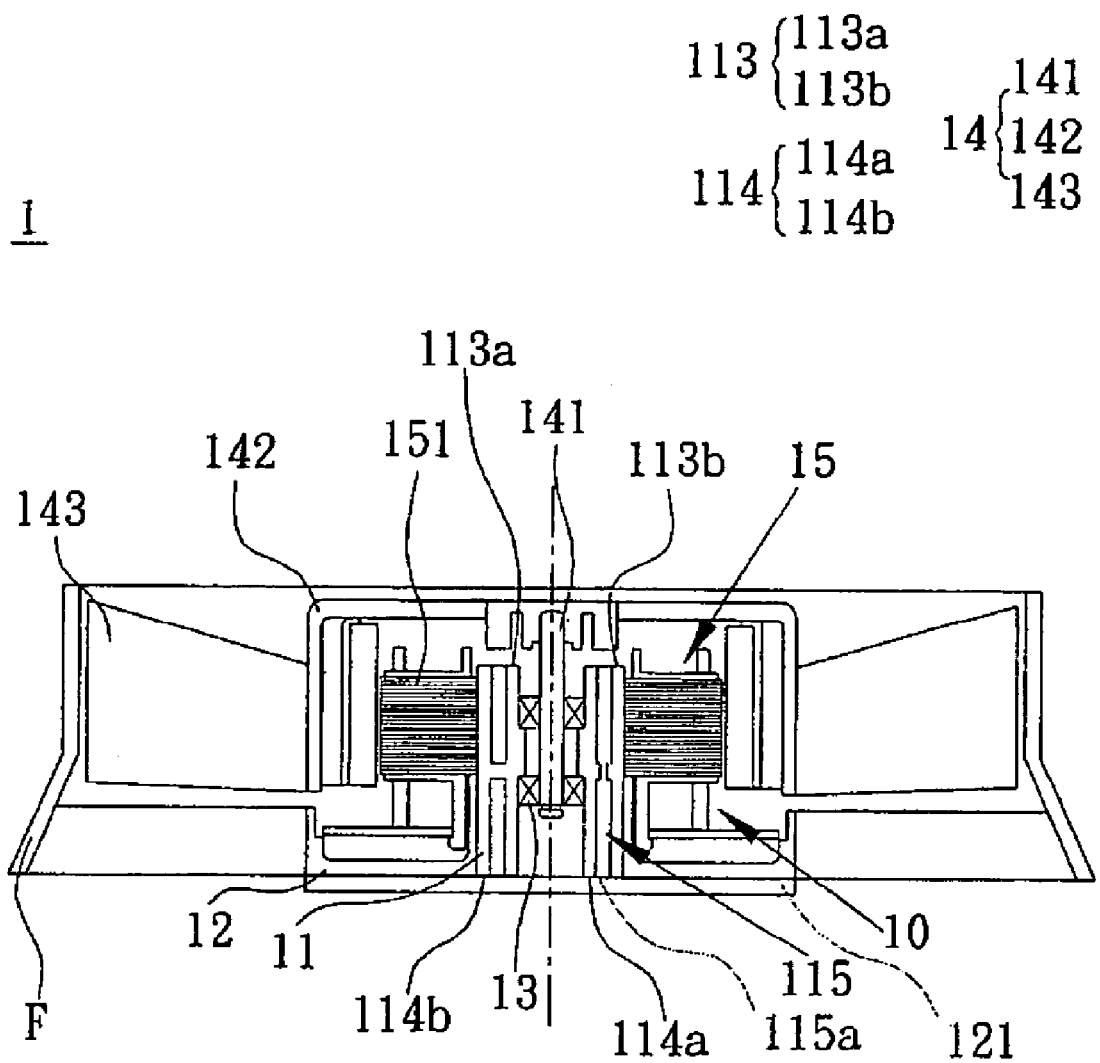
FIG. 1 is a sectional view of a fan according to a preferred embodiment of the present invention.
Figure 2:
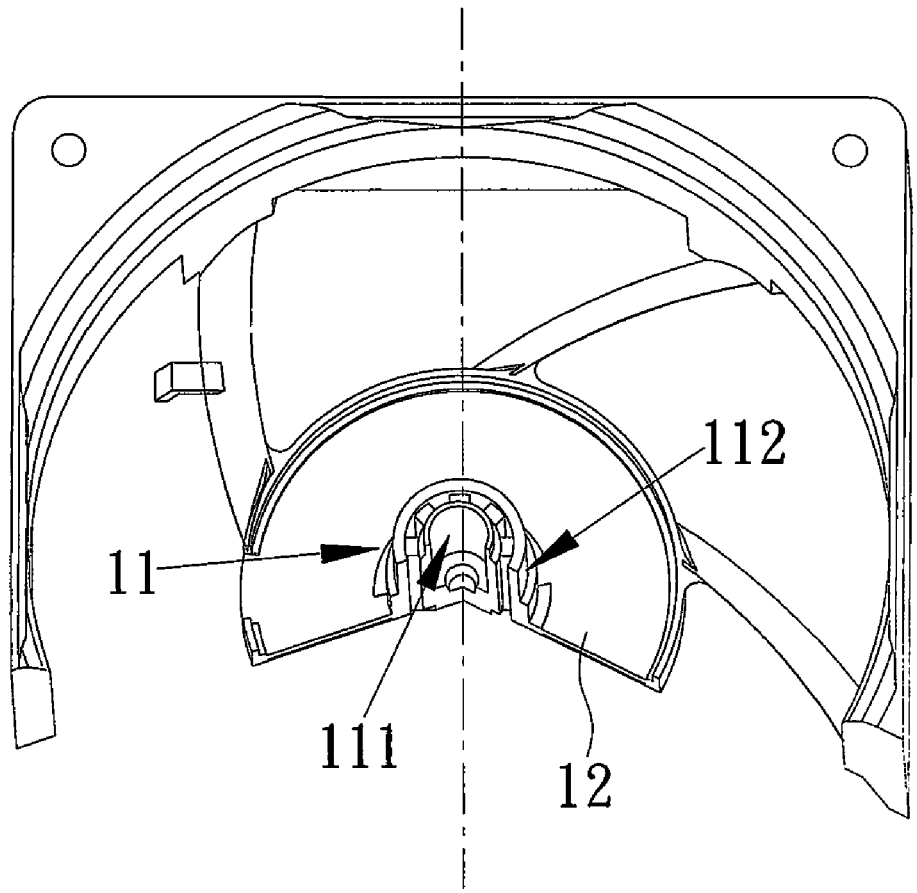
FIG. 2 is a top and partially exploded view of the frame of FIG. 1.

Please refer to both FIG. 1 and FIG. 2, a fan 1 according to a preferred embodiment of the present invention includes a motor 10 and a frame F. The frame F includes a motor base 12, and the motor 10 is disposed on the motor base 12 and inside of the frame F. The motor 10 includes a bushing 11, a bearing 13, a rotor 14 and a stator 15, and the motor 10 is preferably an outer-rotor type motor. The bushing 11 includes an internal wall 111, an external wall 112 and a hollow portion 115. Both the internal wall 111 and the external wall 112 are tube-shaped, and the bushing 11 is a double-layers tube-shaped structure. The hollow portion 115 is disposed between the internal wall 111 and the external wall 112, and the bushing 11 is molded as a single piece and is unitary in construction.

The bushing 11 has a top side 113 and a bottom side 114, and the hollow portion 115 penetrates the bushing 11 from the top side 113 to the bottom side 114. An opening 115a is provided at the bottom of the hollow portion 115. The top side 113 has an inner top side 113a and an outer top side 113b, and the bottom side 114 has an inner bottom side 114a and an outer bottom side 114b. The bushing 11 is connected with the motor base 12 at the outer bottom side 114b. The stator 15 includes a plurality of silicon steel sheets 151 disposed around the bushing 11.

The bearing 13 is disposed in the bushing 11 and connected with the internal wall 111 of the bushing 11 steadily. The rotor 14 includes a shaft 141, a hub 142 and a plurality of blades 143. The shaft 141 passes through the bearing 13. The hub 142 is connected with the shaft 141, and the blades 143 are disposed around the hub 142. When the motor 10 operates, the shaft 141 rotates and drives the hub 142 and the blades 143 to rotate.

Figure 3:
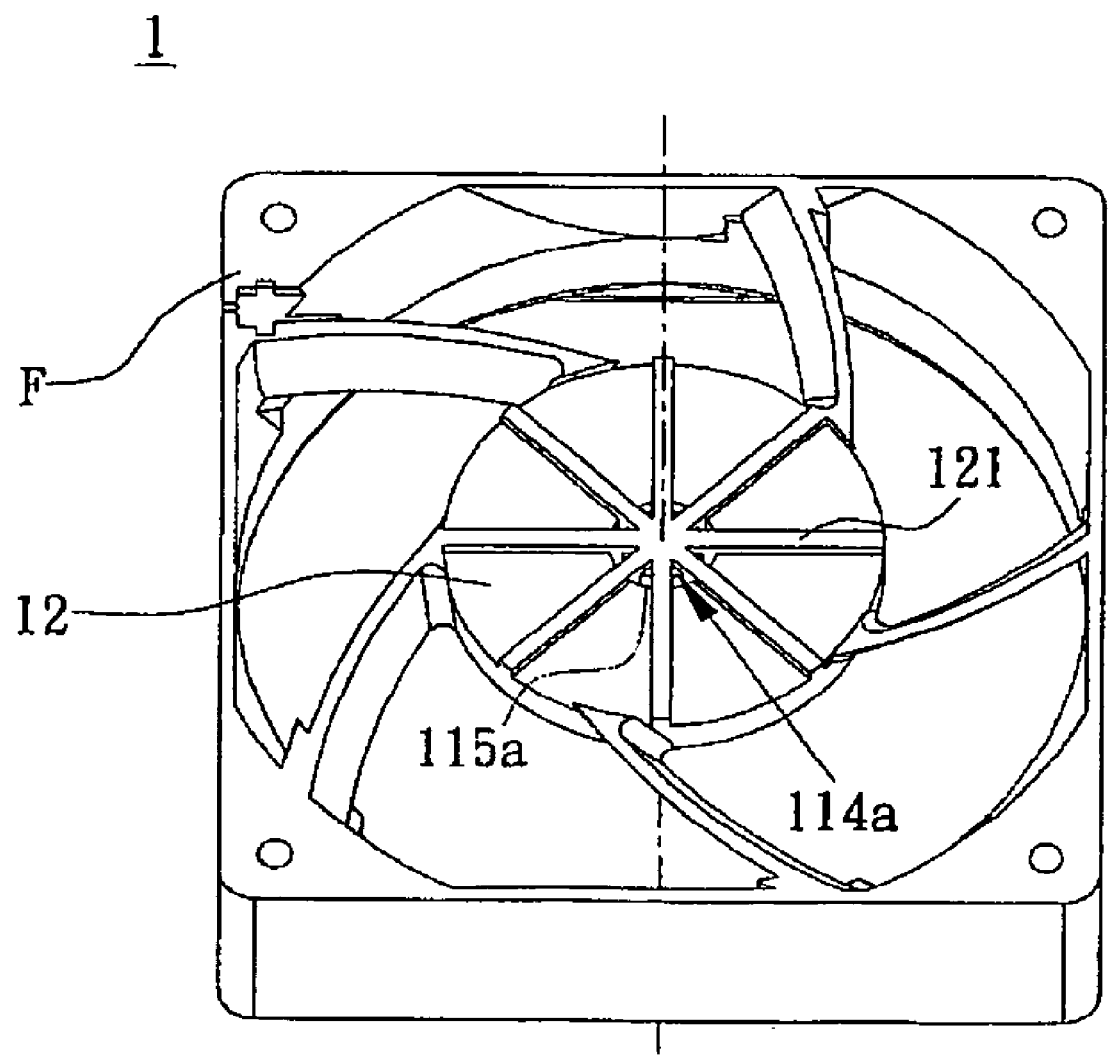
FIG. 3 is a bottom and exploded view of the frame of FIG. 1.

Please refer to FIG. 3, the motor base 12 includes a plurality of supporting parts 121, the supporting parts 121 extend radially from the center of the motor base 12, and the supporting parts 121 are connected to the bottom side 114 of the bushing 11 for supporting the bushing 11.

Figure 4:
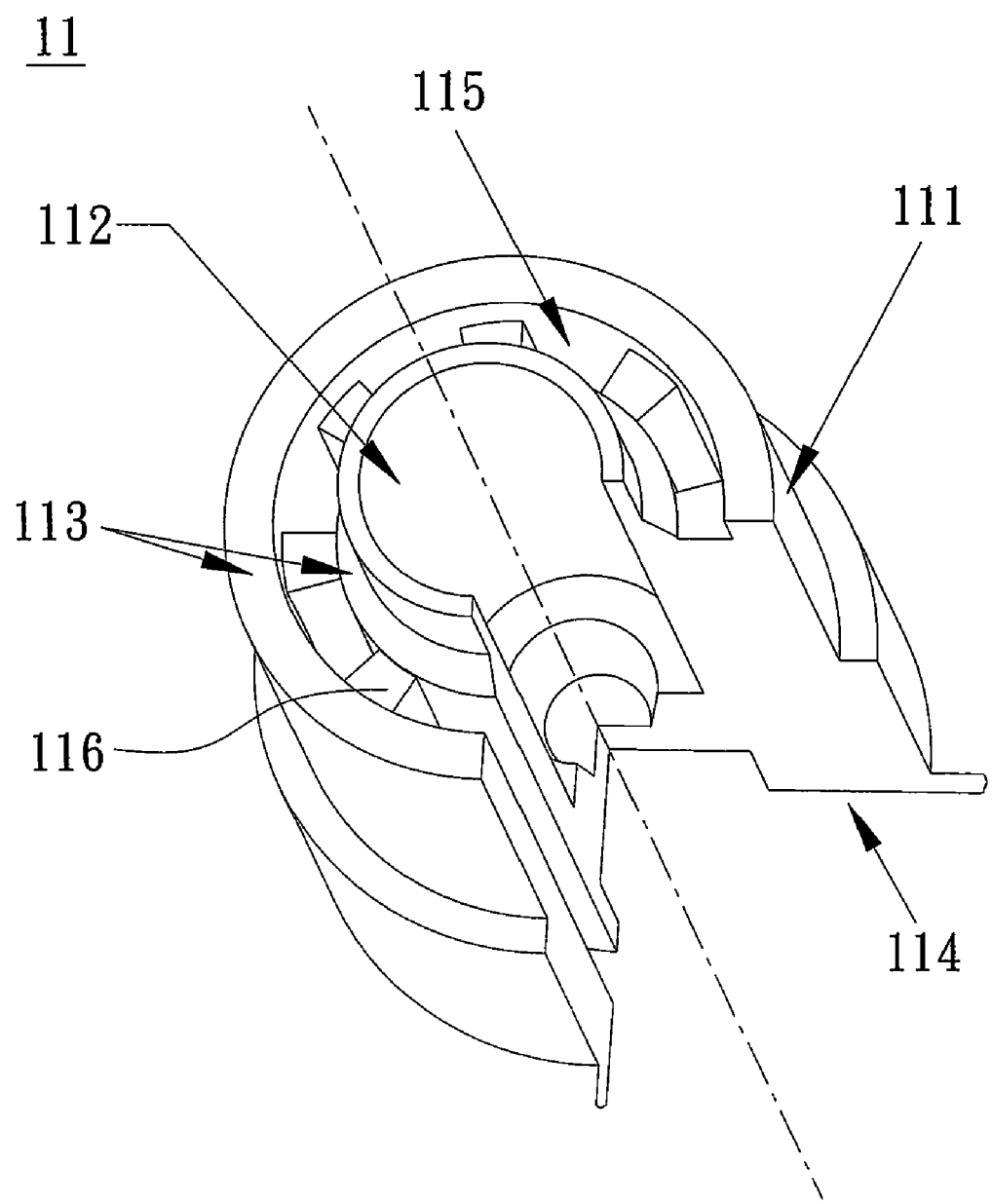
FIG. 4 to FIG. 6 are schematic illustrations of three types of bushings according to a preferred embodiment of the present invention.

Please refer to both FIG. 1 and FIG. 4, the bushing 11 further includes a plurality of partition parts 116 disposed in the hollow portion 115 and connected to the internal wall 111 and the external wall 112. The partition parts 116 are bar-shaped and partition the hollow portion 115 into at least two spaces, and the internal wall 111 and the external wall 112 are propped with each other by the partition parts 116, so that a top view of the partitioned hollow portion 115 can be seen as several partial-annular shapes or a partial-sectorial shape. It is noted that no matter which shape of the partitioned hollow portion 115 from the top view is, as long as the hollow portion 115 penetrates the bushing 11 from the top side 113 to the bottom side 114, any shape of the partitioned hollow portion 115 should be included in present invention.

Because the internal wall 111 and the external wall 112 are tube-shaped, and the bushing 11 is a double-layers tube-shaped structure, when the motor 10 and the fan 1 operate, heats generated between the shaft 141 and the bearing 13 will be conducted to the internal wall 111 of the bushing 11, and then the airflows generated during the operation of the fan 1 will take the heats away. On the other hand, the hollow portion 115 can inhibit heat conduction between the internal wall 111 and the external wall 112, so that only few heats may be conducted to the silicon steel sheets 151 or other components disposed around the bushing 11 through the external wall 112.

Figure 5:
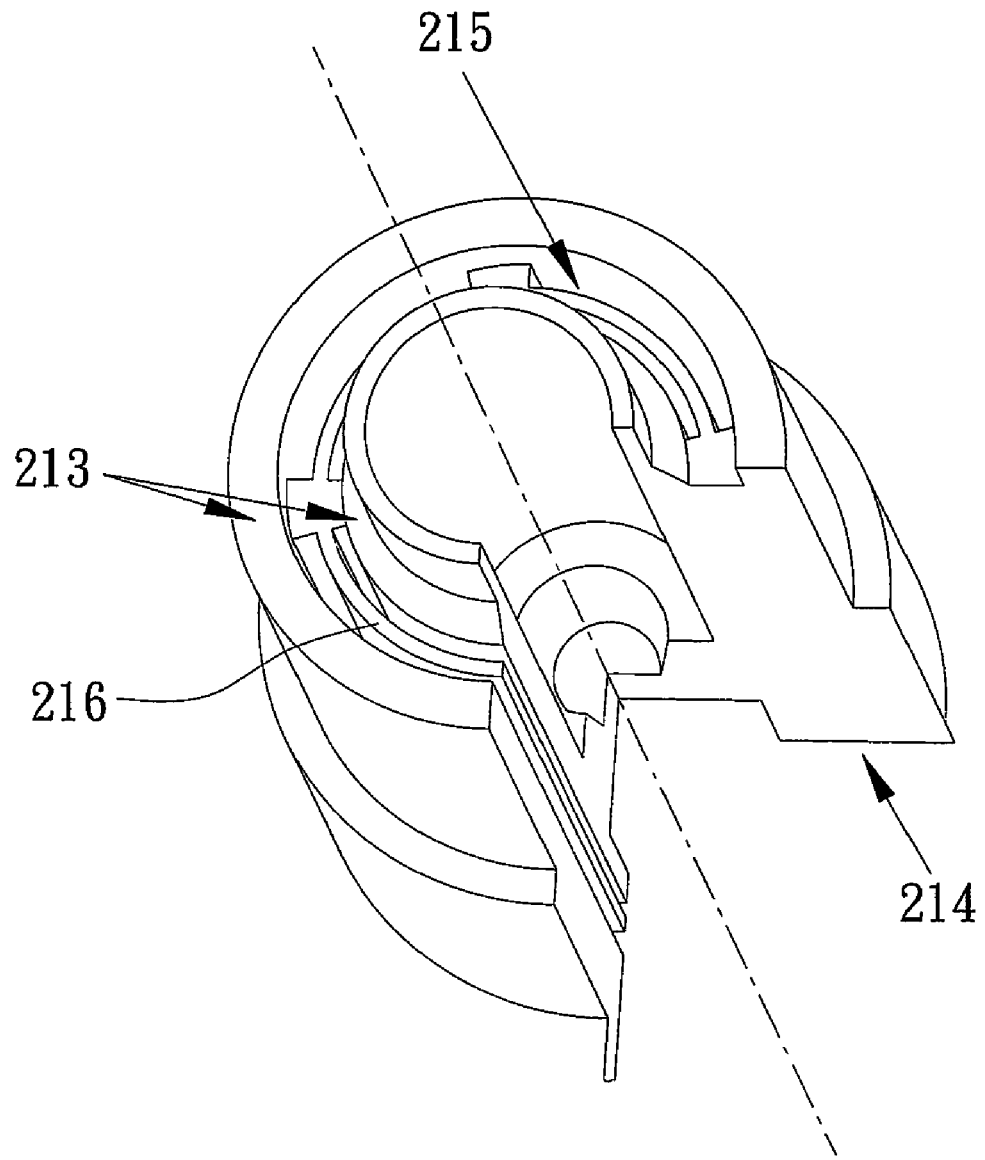

Please refer to FIG. 5, FIG. 5 shows the other type of the bushing of the present invention. The bushing 21 has a partition part 216, the partition part 216 is composed of an annular structure and a plurality of bar-shaped structure which is connected to the internal wall and the external wall. The partition part 216 partitions the hollow portion 215 into an inner space and an outer space which are composed of a plurality of spaces respectively. The top view of the partitioned hollow portion 215 is partial-annular, and the hollow portion 215 also penetrates the bushing 21 from the top side 213 to the bottom side 214 of the bushing 21.

Figure 6:
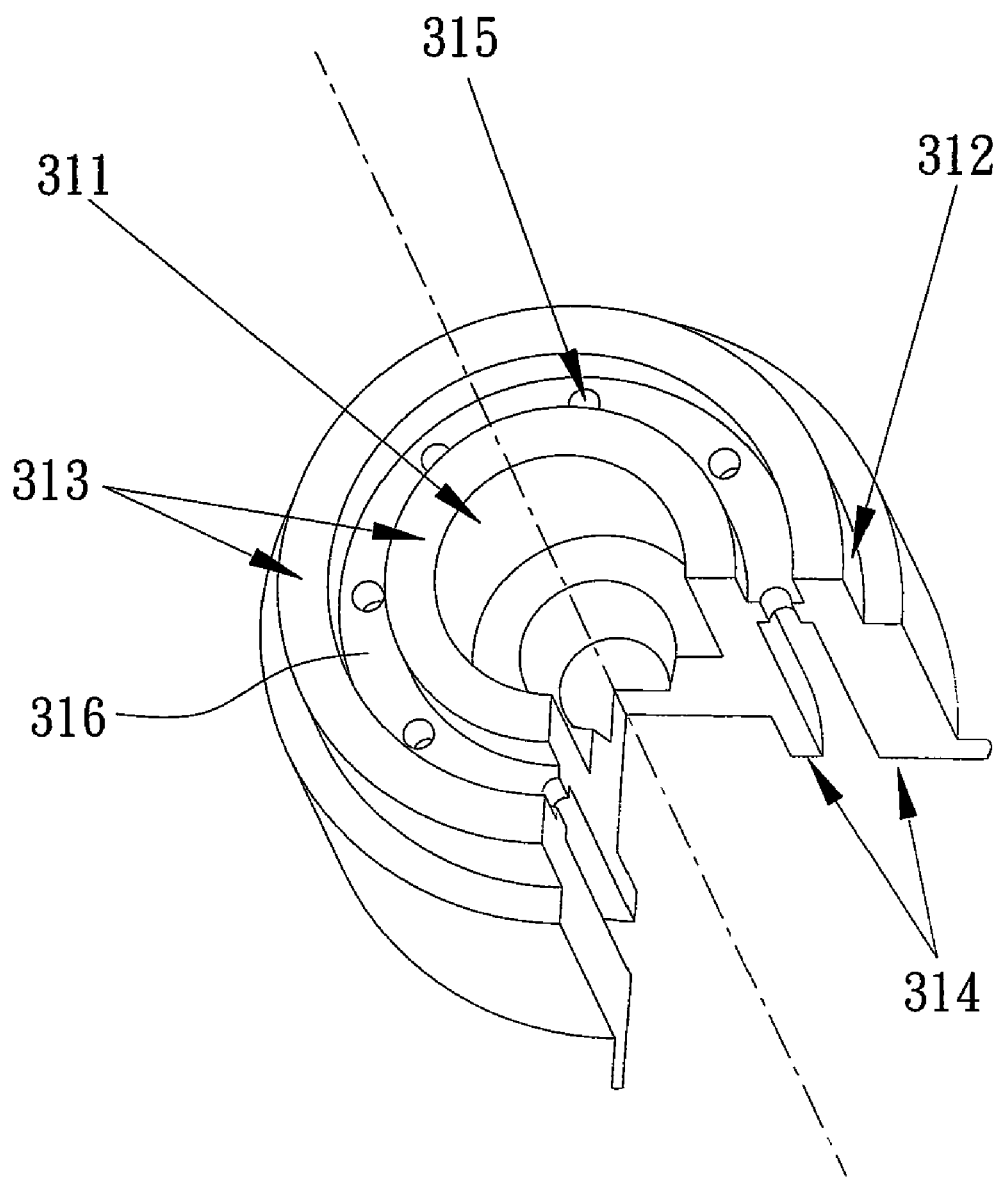

Please refer to FIG. 6, another type of the bushing 31 of the present invention is disclosed. The bushing 31 has a closed ring 316, the closed ring 316 is an annular-plated structure, and the closed ring 316 is connected between the internal wall 311 and the external wall 312. The closed ring 316 partitions the hollow portion 315 into an upper space and a lower space. The hollow portion 315 is formed as a plurality of through holes located on the closed ring 316, and the hollow portion 315 also penetrates the bushing 31 from the top side 313 to the bottom side 314.

In summary, the fan, motor and bushing thereof of the present invention design a hollow portion between the internal wall and the external wall of the bushing, so as to reduce heat conduction between the internal wall and the external wall of the bushing, and heats generated by the motor will not make the other components of the motor to be abnormal, and abnormal operation of the fan can be avoided.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A bushing, comprising an internal wall, an external wall, a hollow portion, a top side and a bottom side, wherein the hollow portion is disposed between the internal wall and the external wall and penetrates the bushing from the top side to the bottom side so as to form an opening at the bottom side, and the opening is adjoining to an outside of the bushing and ambient environment so as to allow airflow therethrough to remove heat generated outside the external wall of the bushing, and the bushing is a single piece and is unitary in construction, the bushing includes at least one partition part, the partition part being only in the hollow portion and the external and internal walls being connected only via the at least one partition part.

2. The bushing according to claim 1, wherein both the internal wall and the external wall are tube-shaped, and the bushing is a double-layered tube-shaped structure.

3. The bushing according to claim 2, wherein the at least one partition part which is disposed in the hollow portion partitions the hollow portion into at least two spaces.

4. The bushing according to claim 3, wherein a top view of the partitioned hollow portion comprises a partial-annular shape or a partial-sectorial shape.

5. The bushing according to claim 3, wherein the partition part is bar-shaped, and the partition part is connected to the internal wall and the external wall.

6. The bushing according to claim 3, wherein the partition part comprises an annular structure and a plurality of bar-shaped structures, and the plurality of bar-shaped structures is connected to the internal wall and the external wall.

7. The bushing according to claim 2, wherein the at least one partition part includes a closed ring in the hollow portion with a plurality of through holes located in the closed ring which is connected between the internal wall and the external wall.

8. A motor, disposed on a motor base, the motor comprising:
a bushing connected with the motor base, the bushing comprising an internal wall, an external wall, a hollow portion, a top side and a bottom side, wherein the hollow portion is disposed between the internal wall and the external wall and penetrates the bushing from the top side to the bottom side so as to form an opening at the bottom side, and the opening is adjoining an outside of the bushing and ambient environment so as to allow airflow therethrough to remove heat generated outside the motor, and the bushing is a single piece and is unitary in construction, the bushing includes at least one partition part, the partition part being only in the hollow portion and the external and internal walls being connected only via the at least one partition part;
a bearing disposed in the bushing;
a shaft passing through the bearing; and
at least one silicon steel sheet disposed around the bushing.

9. The motor according to claim 8, wherein both the internal wall and the external wall of the bushing are tube-shaped, and the bushing is a double-layered tube-shaped structure.

10. A fan, comprising:
a frame comprising a motor base;
a motor disposed on the motor base and inside of the frame, the motor comprising:
a bushing connected with the motor base, the bushing comprising an internal wall, an external wall, a hollow portion, a top side and a bottom side, wherein the hollow portion is disposed between the internal wall and the external wall and penetrates the bushing from the top side to the bottom side so as to form an opening at the bottom side, and the opening is adjoining an outside of the bushing and the ambient environment so as to allow airflow therethrough to remove heat generated outside the fan, and the bushing is a single piece and is unitary in construction, the bushing includes at least one partition part, the partition part being only in the hollow portion and the external and internal walls being connected only via the at least one partition part;

a bearing disposed in the bushing;

a shaft passing through the bearing;

at least one silicon steel sheet disposed around the bushing;

a hub connected with the shaft; and a plurality of blades disposed around the hub;

wherein when the motor operates, the shaft rotates and drives the hub and the blades to rotate.

11. The fan according to claim 10, wherein both the internal wall and the external wall of the bushing are tube-shaped, and the bushing is a double-layered tube-shaped structure.

12. The fan according to claim 10, wherein the at least one partition part which is disposed in the hollow portion partitions the hollow portion into at least two spaces.

13. The fan according to claim 12, wherein a top view of the partitioned hollow portion comprises a partial-annular shape or a partial-sectorial shape.

14. The fan according to claim 12, wherein the partition part is bar-shaped, and the partition part is connected to the internal wall and the external wall.

15. The fan according to claim 12, wherein the partition part comprises an annular structure and a plurality of bar-shaped structure which is connected to the internal wall and the external wall.

16. The fan according to claim 11, wherein the at least one partition part includes a closed ring in the hollow portion with a plurality of through holes located in the closed ring which is connected between the internal wall and the external wall.

17. The fan according to claim 10, wherein the motor is an outer-rotor type motor.

18. The fan according to claim 10, wherein a rotor is constructed by the shaft, the hub and the blades, and the silicon steel sheet is a part of a stator.

* * * * *